(12) United States Patent
Moberg

(10) Patent No.: US 9,561,820 B2
(45) Date of Patent: Feb. 7, 2017

(54) UNCOMMANDED STEERING DETECTION

(71) Applicant: Caterpillar Paving Products Inc., Brooklyn Park, MN (US)

(72) Inventor: Carl Moberg, Dunlap, IL (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 16 days.

(21) Appl. No.: 14/755,634

(22) Filed: Jun. 30, 2015

(65) Prior Publication Data

US 2017/0001663 A1    Jan. 5, 2017

(51) Int. Cl.
| | |
|---|---|
| *A01B 69/00* | (2006.01) |
| *B62D 6/00* | (2006.01) |
| *B62D 11/00* | (2006.01) |
| *B62D 6/04* | (2006.01) |
| *B62D 5/12* | (2006.01) |

(52) U.S. Cl.
CPC . *B62D 6/04* (2013.01); *B62D 5/12* (2013.01); *A01B 69/00* (2013.01)

(58) Field of Classification Search
CPC ............ A01B 69/00; B62D 5/12; B62D 69/00
USPC .............................................. 701/41, 43, 50
See application file for complete search history.

(56) References Cited

U.S. PATENT DOCUMENTS

| | | | | |
|---|---|---|---|---|
| 6,208,922 B1 * | 3/2001 | Easton | ................. | B62D 11/183 180/6.44 |
| 8,020,659 B2 | 9/2011 | Schultz et al. | | |
| 8,214,101 B2 | 7/2012 | Carlton et al. | | |
| 8,490,722 B2 | 7/2013 | Koga et al. | | |
| 8,818,632 B2 * | 8/2014 | Dabbs | ................. | B62D 11/003 180/248 |
| 2011/0010050 A1 * | 1/2011 | Suzuki | ................. | B62D 5/0463 701/41 |

FOREIGN PATENT DOCUMENTS

| | | |
|---|---|---|
| CN | 103101572 A | 5/2013 |
| KR | 101148365 B1 | 5/2012 |

* cited by examiner

*Primary Examiner* — Isaac Smith
(74) *Attorney, Agent, or Firm* — Miller, Matthias & Hull LLP

(57) ABSTRACT

Uncommanded steering detection in a machine can be performed by comparing commanded and actual steering positions of an electro-hydraulic steering cylinder along with a velocity of movement of the cylinder to understand a steering error and whether the actual steering position is moving toward the commanded steering position. A steering error, when above a predetermined threshold, may be cumulatively summed and, if the cumulative sum exceeds a predetermined limit, an alarm may be triggered and the machine may be forced to a safe state (slowed or stopped). The steering error for the actual steering position may be increased if the velocity of movement is not toward the commanded steering position so that the alarm will be triggered sooner. In either case, the response of the machine to steering uncommanded motion will be swifter when the uncommanded motion is more severe (greater error and/or steering in the wrong direction).

20 Claims, 4 Drawing Sheets

UNCOMMANDED STEERING DETECTION

TECHNICAL FIELD

This invention relates generally to an electro-hydraulic steering control system for a machine and, more particularly, to a steering control system for detecting uncommanded motion of the machine and alerting an operator of the machine of the occurrence of the uncommanded motion.

BACKGROUND

Electro-hydraulic steering systems are employed in work machines to provide smooth steering of the work machine under the control of an operator. In conventional work machines with electro-hydraulic steering, turning control is performed by an operator steering lever or other type of steering control mechanism. Even when under the control of the operator, however, the work machine can have instances where uncommanded steering or other motion can occur such that the wheels do not turn as commanded and the work machine does not follow the commanded path. For example, the work machine may move forward in a straight line when the operator tries to turn the machine. In other situations, the work machine may turn where no turn is commanded by the operator, or may turn in the opposite direction than that commanded by the operator. The latter turn anomalies may be particularly problematic due to the risks of hitting workers or structures near the work machine, or driving the work machine over surfaces or terrain that may cause instability of the machine, and may be symptomatic of failures in the steering control system of the work machine. Moreover, the uncommanded motion may be more problematic when the machine is operating at higher speeds where the operator has less time to react to and correct the uncommanded motion.

Control systems for hydrostatically driven and steered equipment are known in the art. For example, U.S. Pat. No. 8,818,632, issued on Aug. 26, 2015, to Dabbs et al., entitled "Detection of Uncommanded Motion of a Steering Motor," teaches, in a machine having a differential steering control system, uncommanded motion may be determined by comparing an actual speed of a steering motor to a commanded turn direction signal from an operator. Where uncommanded motion is occurring, the steering motor speed and time-rate-of-change of the steering motor speed may be used to determine a weighted steering motor speed that is accumulated over a series of sample cycles and compared to an integration limit to determine whether the operator should be warned of the occurrence of uncommanded motion. The integration limit may be based on a factor indicative of the responsiveness of the machine, such as the oil temperature.

This system may detect uncommanded motion in a work machine having differential steering and warning the operator. However, uncommanded motion may occur in work machines having electro-hydraulic steering systems, and some types of uncommanded motion may be viewed as more problematic and may require a faster response from the work machine when the problematic situations occur.

SUMMARY OF THE INVENTION

In one aspect of the present disclosure, the invention is directed to a steering control system for a machine. The steering control system may include a hydraulic steering cylinder having a steering piston that moves in a first piston direction to cause the machine to turn toward a first turn direction and moves in a second piston direction to cause the machine to turn toward a second turn direction, a steering control mechanism operatively connected to the hydraulic steering cylinder and actuatable to cause the steering piston to move in the first piston direction and the second piston direction, a steering control device for providing a steering command signal indicating a command to cause the machine to turn in one of the first turn direction and the second turn direction, a steering piston position sensor operatively connected to the hydraulic steering cylinder to detect a position of the steering piston and to transmit a steering piston position signal indicating the position of the steering piston, and an electronic control unit operatively connected to the steering control mechanism, the steering control device, and the steering piston position sensor. The electronic control unit may be configured to receive the steering command signal from the steering control device and output a steering control mechanism command signal to cause the steering control mechanism to actuate to move the steering piston in the one of the first piston direction and the second piston direction corresponding to the one of the first turn direction and the second turn direction in the steering command signal, to determine an actual steering piston position of the steering piston based on the steering piston position signal, and to compare the actual steering piston position to a commanded steering piston position. The electronic control unit may further be configured to determine a steering position error in response to determining that the actual steering piston position is not equal to the commanded steering piston position, to add the steering position error to a cumulative integration value with the cumulative integration value being increased so long as the actual steering piston position is not equal to the commanded steering piston position, to compare the cumulative integration value to an integration limit for uncommanded motion of the machine, and to execute an uncommanded motion response strategy in response to determining that the cumulative integration value is greater than the integration limit.

In another aspect of the present disclosure, the invention is directed to a method for detecting and responding to uncommanded motion in a machine. The machine may include a hydraulic steering cylinder with a steering piston that moves in a first piston direction to cause the machine to turn in a first turn direction and moves in a second piston direction to cause the machine to turn in a second turn direction. The method for detecting and responding to uncommanded motion in the machine may include, at an electronic control unit, generating a steering command signal to move the steering piston in one of the first piston direction and the second piston direction, determining an actual steering piston position of the steering piston, comparing the actual steering piston position to a commanded steering piston position. The method may further include, at the electronic control unit, determining a steering position error in response to determining that the actual steering piston position is not equal to the commanded steering piston position, adding the steering position error to a cumulative integration value for uncommanded motion with the cumulative integration value being increased so long as the actual steering piston position is not equal to the commanded steering piston position, comparing the cumulative integration value to an integration limit for uncommanded motion of the machine, and executing an uncommanded motion response strategy in response to determining that the cumulative integration value is greater than the integration limit.

In a further aspect of the present disclosure, the invention is directed to a method for detecting and responding to uncommanded motion in a machine having a steering control mechanism that causes the machine to turn in a first turn direction and in a second turn direction. The method for detecting and responding to uncommanded motion in the machine may include, at an electronic control unit, generating a steering command signal to cause the steering control mechanism to turn the machine in one of the first turn direction and the second turn direction, determining an actual steering direction of the machine, comparing the actual steering direction to a commanded steering direction of the steering command signal. The method may further include, at the electronic control unit, calculating a steering position error in response to determining that the actual steering direction is not equal to the commanded steering direction, wherein the steering position error is set to a greater value in response to determining that the actual steering direction is opposite the one of the first turn direction and the second turn direction in the steering command signal, adding the steering position error to a cumulative integration value for uncommanded motion with the cumulative integration value being increased so long as the actual steering direction is not equal to the commanded steering direction, comparing the cumulative integration value to an integration limit for uncommanded motion of the machine, and executing an uncommanded motion response strategy in response to determining that the cumulative integration value is greater than the integration limit.

It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated and constitute a part of this specification, illustrate exemplary embodiments of the invention and, together with the description, serve to explain the principles of the invention. In the drawings.

DETAILED DESCRIPTION

Figure 1:
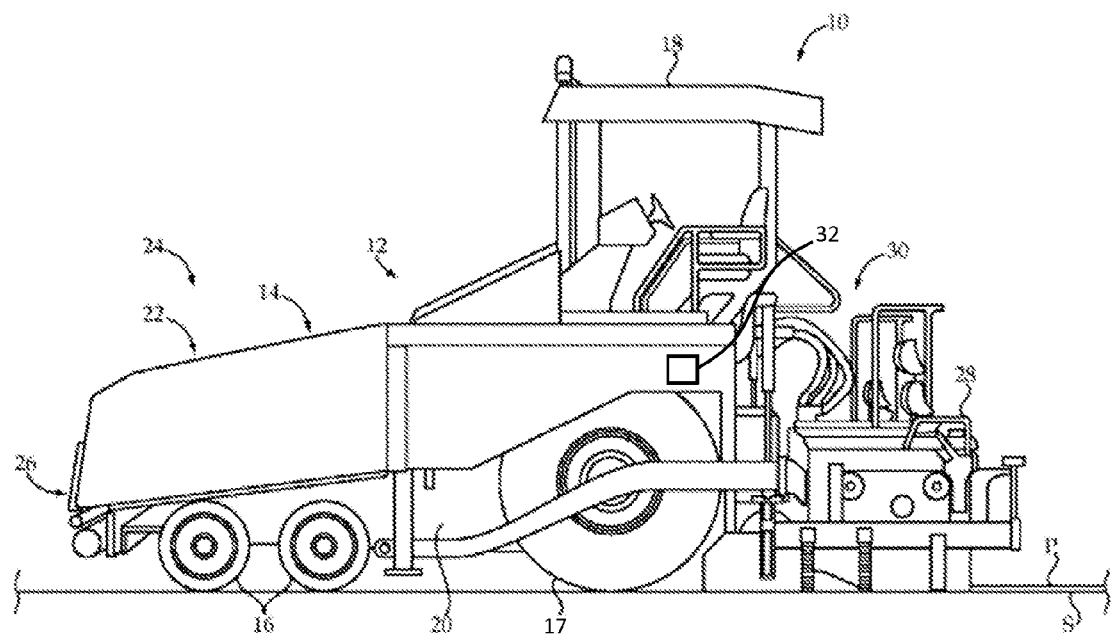
FIG. 1 is a diagrammatic side view of a machine in the form of an asphalt paver in which uncommanded motion detection in accordance with the present disclosure may be implemented.

An exemplary embodiment of a machine 10 in the form of a paving machine is shown generally in FIG. 1. The illustrated machine 10, which may also be referred to as an asphalt paver, may be any work machine that may be steered by an electro-hydraulic steering system as discussed further below. The machine 10 as illustrated may be used to distribute a layer of paving material P on a surface S of a roadway or other area. The machine 10 generally includes a tractor portion 12 including a power source 14, such as an internal combustion engine, ground-engaging propulsion elements, such as front wheels 16 and rear wheels 17, some or all of which may be powered by the power source 14, and an operator control station 18. The power source 14, the front wheels 16, the rear wheels 17, and the operator control station 18 may all be supported on a frame 20 of the machine 10. The frame 20 may also support various other components and systems, including a hopper 22 supported on a front portion 24 of the frame 20 for receiving the paving material P. The front wheels 16 may be mounted on the frame 20 for left and right rotation under the influence of the electro-hydraulic steering system (not shown) to steer the machine 10 as the machine 10 is driven by the power source 14.

A conveyor 26 may also be supported on the frame 20 and may convey the paving material P received within the hopper 22 to a screed 28, such as a free floating screed, coupled with the machine 10, such as via tow arms, at a rear portion 30 of the frame 20. The screed 28 may distribute and, at least partially, compact the paving material P into a mat on the desired paving surface S. The tractor portion 12 of the machine 10 may also include hydraulic drives and controls, along with various other known machine components, for operating various systems and components of the machine 10. The screed 28 of the machine 10 may also include additional components and systems, such as, for example, leveling arms, vibrators, sensors, and controllers, as are known to those skilled in the art. Such additional systems and components are not within the scope of the present disclosure and, thus, will not be discussed herein in greater detail.

The machine 10 may further include an electronic control unit 32 receiving commands from implement and steering controls (not shown) in the operator control station 18. As the operator manipulates to the controls, the electronic control unit 32 in response controls the power source 14 and electro-hydraulic steering system to drive and steer the machine 10 over the surface S, and operably controls actuators of the hopper 22, the conveyor 26 and the screed 28 to lay the paving material P on the surface S. The exemplary asphalt paver is used herein for purpose of illustration, but the uncommanded motion control strategies in accordance with the present disclosure may be implemented in any other type of machine or vehicle where uncommanded motion may be undesirable, or other drive mechanism where wheels are turned to steer a machine or other vehicle. Consequently, "paver," "machine," "work machine," "vehicle" or other similar terms may be used to generically refer to equipment that may implement electro-hydraulic steering systems to steer the machine, and in which uncommanded motion may be present and controlled.

Figure 2:
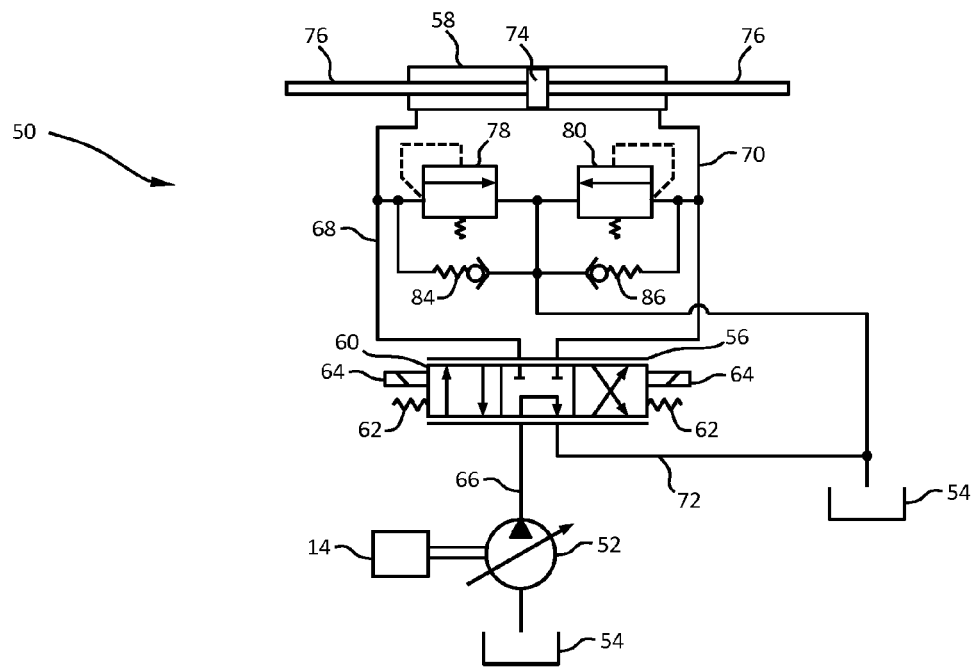
FIG. 2 is a schematic view of an exemplary electro-hydraulic steering control mechanism that may be implemented in a machine such as that shown in FIG. 1.

FIG. 2 illustrates an electro-hydraulic steering control mechanism 50 that may be incorporated within the machine 10 for steering the machine 10 by turning the front wheels 16 to the left and to the right. Though front wheels 16 are illustrated herein as driving the machine 10 over the surface S, those skilled in the art will understand that steering may be provided by turning other types of ground-engaging propulsion elements, such as half-tracks, or by other steering mechanisms such as connecting the front portion 24 and the rear portion 30 with an articulating joint allowing the front portion 24 to pivot relative to the rear portion 30 to steer the machine 10. Implementation of the steering control mechanism 50 in machines having such components and configurations is contemplated by the inventors. The steering control mechanism 50 may include a pressurized steering fluid source such as a variable displacement pump 52 driven by the power source 14. The use of accumulators and other types of pressurized fluid sources in addition to, or as an alternative to, the pump 52 is also contemplated.

The pump 52 may draw steering fluid from a low-pressure reservoir or tank 54, compress the steering fluid, and output the pressurized steering fluid to a steering control valve 56. The steering control valve 56 in this example may be a solenoid-operated, three-position, four-way valve that is movable in response to commands from the electronic control unit 32 to selectively convey pressurized steering fluid from the steering control valve 56 and the pump 52 to either side of a double-acting, double rod-end hydraulic steering cylinder 58. The steering control valve 56 may include a valve element 60 that is movable between a normally-closed position, a left turn position and a right turn position. The steering control valve 56 may be spring biased toward the normally-closed position by springs 62, and have steering control valve actuators 64 operatively connected to the electronic control unit 32 to receive control signals causing the steering control valve actuators 64 to move the valve element 60 toward the left turn and right turn positions in a manner understood in the art. The steering control valve 56 may have a steering fluid inlet placed in fluid communication with an outlet of the pump 52 by a high-pressure steering fluid line 66, a first valve outlet placed in fluid communication with a first side of the steering cylinder 58 by a first steering fluid supply line 68, a second valve outlet placed in fluid communication with a second side of the steering cylinder 58 by a second steering fluid supply line 70, and a return outlet placed in fluid communication with the tank 54 by a low-pressure return line 72.

When the steering control valve actuators 64 are not actuated to move the valve element 60 and the steering control valve 56 is in the normally-closed position due to the biasing forces of the springs 62, the flow of pressurized steering fluid from the pump 52 is cut off from the valve outlets and the steering fluid supply lines 68, 70 and is directed to the return outlet to drain the steering fluid to the tank 54. In this position, steering fluid is not communicated to either side of the steering cylinder 58 so that a steering piston 74 of the steering cylinder 58 remains in place and piston rods 76 will maintain the front wheels 16 in their current positions. When the steering control valve actuators 64 are actuated to move the valve element 60 to the right as shown in FIG. 1, the high-pressure steering fluid line 66 is placed in fluid communication with the first steering fluid supply line 68 to provide pressurized steering fluid to the left side of steering cylinder 58 and cause the steering piston 74 and piston rods 76 to move to the right and turn the front wheels 16. At the same time, the second steering fluid supply line 70 is placed in fluid communication with the low-pressure return line 72 to drain the steering fluid in the steering cylinder 58 to the right of the steering piston 74 and compressed by the movement of the steering piston 74 to the tank 54.

In a similar way, when the steering control valve actuators 64 are actuated to move the valve element 60 to the left as shown in FIG. 1, the high-pressure steering fluid line 66 is placed in fluid communication with the second steering fluid supply line 70 to provide pressurized steering fluid to the right side of steering cylinder 58 and cause the steering piston 74 and piston rods 76 to move to the left, and the first steering fluid supply line 68 is placed in fluid communication with the low-pressure return line 72 to drain the steering fluid to the left of the steering piston 74 to the tank 54. The fluid flow out of the steering control valve 56 may be variable so that the rate of fluid flow increases as the valve element 60 move toward the left turn and right turn positions so that the amount of movement of the valve element 60 may control the amount of pressurized fluid flow to the steering cylinder 58 and the speed that the steering piston 74 moves to turn the front wheels 16 to match the steering commands from the operator.

Situations may arise during operation of the machine 10 that can create excessive pressures within the steering control mechanism 50 that can cause damage to the components, such as when one of the front wheels 16 strikes an obstruction that causes the front wheels 16 to turn in a direction that is not commanded by the operator. To relieve excess pressure in the compressing side of the steering cylinder 58 and prevent cavitation in the expanding side of the steering cylinder 58 during wheel impact situations, the steering control mechanism 50 may further include shock relief valves 78, 80 connecting the steering fluid supply lines 68, 70, respectively, to an over-pressure return line 82 for potential flow to the tank 54, and anti-cavitation check valves 84, 86 in parallel with shock relief valves 78, 80, respectively. When an impact with an object causes the wheels to turn sharply in the direction that moves the steering piston 74 to the left to increase the pressure in the first steering fluid supply line 68 and decrease the pressure in the second steering fluid supply line 70, for example, the shock relief valve 78 may sense the increased pressure and open to vent fluid from the first steering fluid supply line 68 to the over-pressure return line 82. At the same time, the reduced pressure in the second steering fluid supply line 70 may allow the anti-cavitation check valve 86 to open and draw steering fluid flowing to the tank 54 into the second steering fluid supply line 70 to prevent cavitation in the expanding side of the steering cylinder 58. In a similar manner for impacts causing the wheels to turn sharply in the opposite direction, the shock relief valve 80 opens to vent steering fluid from the second steering fluid supply line 70 to the tank 54, and the anti-cavitation check valve 84 may open to provide steering fluid to the first steering fluid supply line 68 to fill the expanding cavity of the steering cylinder 58.

Those skilled in the art will understand that the particular configuration of the steering control mechanism 50 illustrated in FIG. 2 and described in the accompanying text is exemplary, and other arrangements of elements may be used and are contemplated by the inventor for controlling the steering cylinder 58 to turn the front wheels 16. For example, the shock relief valves 78, 80 and the anti-cavitation check valves 84, 86 may be omitted. Also, the steering control valve actuators 64 may be replaced with pilot pressure lines from solenoid-operated pilot valves that may be controlled by the electronic control unit 32 to apply varying pressures to the ends of the valve element 60 to move the valve element 60 between the normally-closed position and the left and right turn positions. Alternative pressurized steering fluid sources may also be implemented. Regardless of the specific mechanism for controlling the movement of the steering piston 74 of the steering cylinder 58, the method for detecting and reacting to uncommanded motion discussed herein may have equal applicability.

Figure 3:
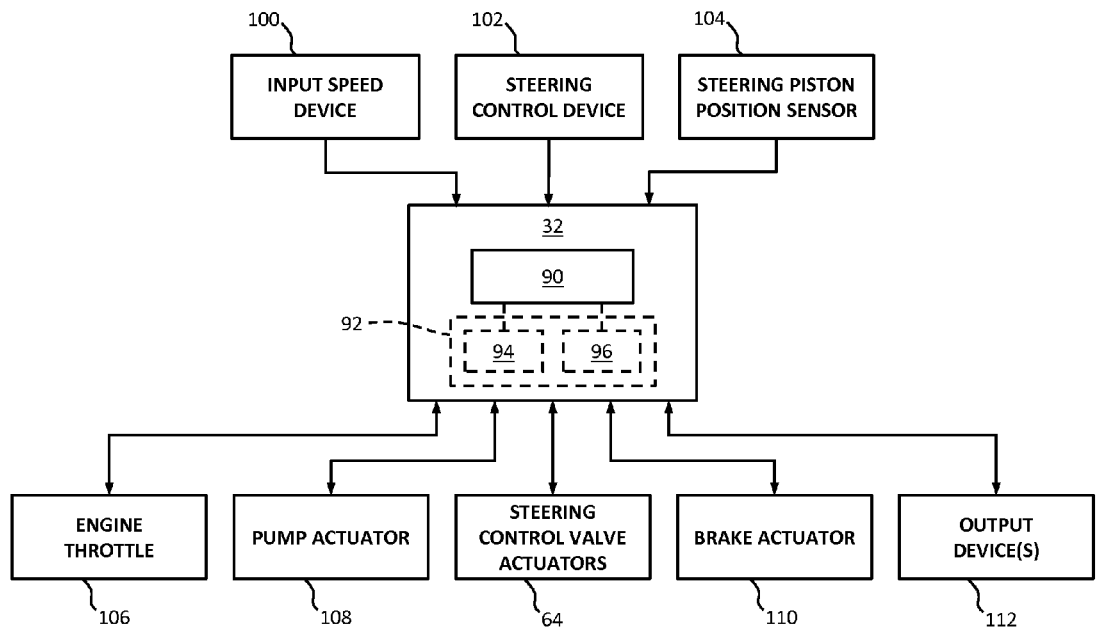
FIG. 3 is a schematic view of electrical components of the machine of FIG. 1.

Referring now to FIG. 3, the electronic control unit 32 may include a microprocessor 90 for executing a specified program, which controls and monitors various functions associated with the machine 10. The microprocessor 90 includes a memory 92, such as read only memory (ROM) 94, for storing a program, and a random access memory (RAM) 96 which serves as a working memory area for use in executing the program stored in the memory 92. Although the microprocessor 90 is shown, it is also possible and contemplated to use other electronic components such as a microcontroller, an ASIC (application specific integrated circuit) chip, or any other integrated circuit device.

The electronic control unit 32 electrically connects to the control elements of the machine 10, as well as various input devices for commanding the operation of the machine 10 and monitoring their performance. As a result, the electronic control unit 32 may be electrically connected to input devices detecting operator input and providing control signals to the electronic control unit 32 that may include an input speed device 100, such as a gas pedal or accelerator, that is manipulated by the operator to regulate the speed of the machine 10. The input speed device 100 may transmit speed control signals that are interpreted by the electronic control unit 32 to determine a commanded speed. A steering control device 102, such as a steering wheel, joystick, tiller, push/pull bar, pedals, or the like in the operator control station 18, may transmit steering command signals to the electronic control unit 32 that are interpreted to determine a commanded direction for the front wheels 16 to move the machine 10 along a desired path and a commanded rate of change or velocity of the position of the front wheels 16 to arrive at the commanded direction. The speed of the manipulation of the steering control device 102 may determine the commanded rate of change subject to the operating constraints of the steering control mechanism 50. In alternate embodiments, the steering control device 102 may be located remotely from the machine 10, such as at a central control station for the work area, where remote operators may input commands that are transmitted to the machine 10 via an appropriate communication media, received at the machine 10 and processed by the electronic control unit 32 to steer the machine 10. In other alternate embodiments, the steering control device 102 may be software stored in the memory 92 of the electronic control unit 32 to determine a direction in which the machine 10 should turn based on current operating information about the machine 10, such as, for example, its current location, direction of travel and a planned route over the surface S, to execute a prescribed work function.

The electronic control unit 32 may also be connected to sensing devices providing control signals with values indicating real-time operating conditions of the machine 10, such as a steering piston position sensor 104 that may be operatively connected to the steering cylinder 58, the steering piston 74 and/or one of the piston rods 76 to detect the position of the steering piston 74. The steering piston position sensor 104 may transmit steering piston position signals to the electronic control unit 32 as feedback for control of the position of the steering piston 74 and detection of uncommanded motion as discussed further below. As a convention for subsequent discussions herein, a value of zero for the steering piston position signals may indicate that the steering piston 74 is in a normal position for positioning the front wheels 16 to drive the machine 10 in a straight line, negative values for the steering piston position signals may indicate that the steering piston 74 is moved from normal position to turn the machine 10 to the left, and positive values for the steering piston position signals may indicate that the steering piston 74 is moved from normal position to turn the machine 10 to the right. A steering piston position signal valve of 100 may represent a full or maximum right turn position, and a value of −100 may represent a full or maximum left turn position.

The electronic control unit 32 may also be electrically connected to output devices to which control signals are transmitted and from which control signals may be received by the electronic control unit 32, such as, for example, an engine throttle 106 that may control the speed of the power source 14 in response to signals from the input speed device 100, a pump actuator 108 that may control the position of a swash plate or other flow control device of the pump 52, and the steering control valve actuators 64 discussed above. The steering control valve actuators 64 may be solenoids or other type of actuators to which the electronic control unit 32 outputs control signals or solenoid current to move the valve element 60 to desired positions. The electronic control unit 32 may also be electrically connected to a brake actuator or actuators 110 that may cause hydraulic fluid to flow to braking devices to engage and reduce the speed of the machine 10, in particular when dangerous uncommanded motion situations exist, and to output devices 112 in and around the operator control station 18 that may provide sensory perceptible outputs to an operator of the machine 10, including warnings to the operator during the uncommanded motion situations as discussed further below. Those skilled in the art will understand that the input devices, output devices and operations of the electronic control unit 32 described herein are exemplary only, and that additional and alternative devices may be implemented in the machine 10 in accordance with the present disclosure to monitor the operations of the machine 10 and inputs provided by operators of the machine 10, and to control the power source 14, the steering control mechanism 50, and other systems of the machine 10 to operate in a desired manner.

Figure 4:
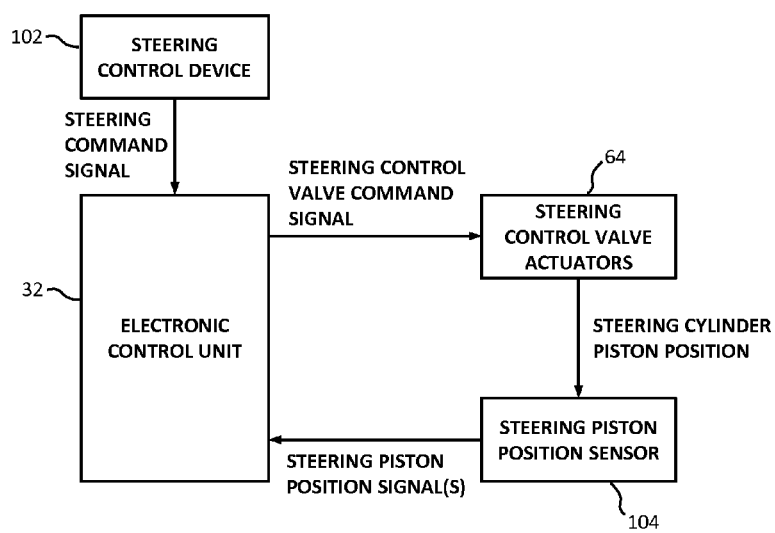
FIG. 4 is a system level diagram illustrating a flow of control signals and sensor inputs for an electro-hydraulic steering control system in accordance with the present disclosure of the machine of FIG. 1.

In operation, the power source 14 provides propulsive power to the rear wheels 17. FIG. 4 is a system level diagram illustrating the flow of control signals and sensor inputs for the steering control mechanism 50 shown in FIG. 2. The steering control device 102 provides a steering command signal to the electronic control unit 32 indicative of a command to turn to the left or to the right at a desired turn radius, or to drive the machine 10 straight. In response to the steering command signal, the electronic control unit 32 outputs steering control valve command signals commanding the steering control valve actuators 64 to move the valve element 60 and create steering fluid flow to move the steering piston 74 and turn the front wheels 16 at a commanded rate based on the value of the steering command signal if a change from the current path of travel is indicated. The steering piston position sensor 104 may sense the position of the steering piston 74 and transmit steering piston position signals to the electronic control unit 32 at a predetermined sampling rate, such as 50 Hz so that the piston position is determined every 20 msec.

Figure 5:
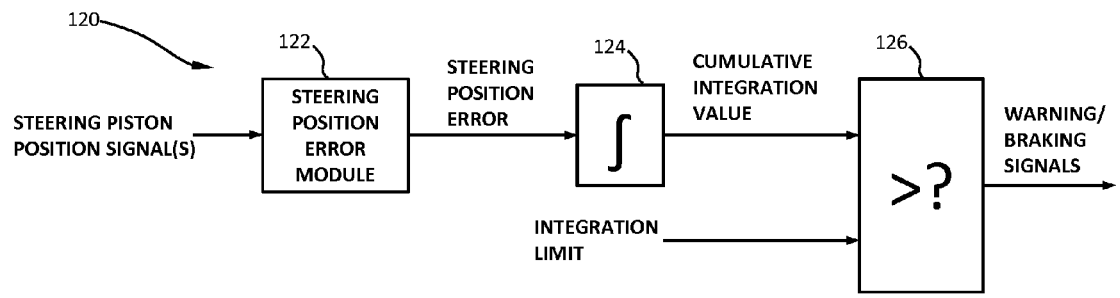
FIG. 5 is a schematic diagram of an uncommanded motion monitoring algorithm in accordance with the present disclosure of the machine of FIG. 1.

The steering piston position signals may be interpreted by the electronic control unit 32 to determine the actual position of the steering piston 74 and, consequently, the actual turn direction of the machine 10 for comparison to the turn direction commanded by the steering control device 102 and output by the electronic control unit 32 to the steering control valve actuators 64. If the actual steering piston position is equal to the commanded steering piston position or indicates steering in the commanded direction, the machine 10 is moving as desired without uncommanded motion. However, if the actual steering piston position is not equal to the commanded position, then uncommanded motion may be occurring and the machine 10 may not be moving along the course desired by the operator. Uncommanded motion can occur where steering of the machine 10 is occurring without steering commands (i.e. the steering command signal is zero or neutral and the steering piston position signals indicate movement of the steering piston 74 from the straight position), where steering is commanded but the machine 10 is turning in the opposite direction (i.e. the steering command signal is not zero or neutral and the steering piston position signals indicate that the steering piston 74 is moving in the opposite direction as the commanded motion or displacement), or where steering is commanded but the machine 10 is moving straight (i.e. the steering control valve command signal is not zero or neutral and the steering piston position signals indicate that the steering piston 74 is not moving). The second scenario for uncommanded motion is particularly important as an indication of a non-electrical failure of the steering control mechanism 50, but any uncommanded motion can create safety issues. Depending on the implementation, electrical failures in the steering control mechanism are typically detected by diagnostic software in the electronic control unit 32 that can detect the failure and shut down the steering and the machine 10 before uncommanded motion would be detected. However, in implementations without electronic diagnostic hardware and software, detection of uncommanded motion can also be an indication of an electrical failure of the steering control mechanism 50.

Where uncommanded motion is detected, the amount and duration may be evaluated to determine whether the operator should be warned and the machine 10 should be stopped. FIG. 5 illustrates a diagram of an uncommanded motion monitoring algorithm 120 that may determine when uncommanded motion requires corrective action. The uncommanded motion monitoring algorithm 120 may be performed once the electronic control unit 32 determines that the actual path of motion of the machine 10 does not match the commanded path of motion from the steering command signals, such as when the position of the steering piston 74 does not match the position expected by the electronic control unit 32 based on the steering control valve command signals transmitted to the steering control valve actuators 64.

Once uncommanded motion is detected based on a prescribed steering error threshold between an expected position of the steering piston 74 and the actual steering piston position from the steering piston position sensor 104, the steering piston position signals may be used by a steering position error module 122 to determine a steering piston velocity. The steering position error module 122 may be programmed into the software executing the uncommanded motion monitoring algorithm 120 and stored in the memory 92 of the electronic control unit 32, or otherwise implemented at the machine 10. The steering piston velocity may be calculated by the electronic control unit 32 based on the steering piston position signals transmitted from the steering piston position sensor 104 over successive sampling cycles, and may provide an indication of the type of uncommanded motion that is occurring. In one embodiment, for example, the steering piston velocity may be calculated by subtracting the previous steering piston position from the current steering piston position, and dividing the difference by the sample cycle time. Using the convention discussed above where positive values of the steering piston position up to 100 reflect turning of the front wheels 16 to the right and negative values up to −100 reflecting turning to the left, the steering piston velocity may have a positive value when the steering piston 74 moves in the direction to turn the front wheels 16 to the right, and a negative value when the steering piston 74 moves to turn the front wheels 16 to the left. Those skilled in the art will understand that the method of calculating a steering piston velocity is exemplary, and other methods are available for determining direction of movement of steering piston 74 and distinguishing between right turn movement and left turn movement, with or without a magnitude, and such methods are contemplated by the inventor as having use in uncommanded steering detection in accordance with the present disclosure.

The uncommanded motion monitoring algorithm 120 may use the steering piston position and velocity to determine the steering position error. The steering piston velocity may be used in the uncommanded motion monitoring algorithm 120 to detect the machine 10 turning in the wrong direction due to a non-electrical failure of the steering control mechanism 50. The uncommanded motion monitoring algorithm 120 may respond to the wrong direction turning by causing a correspondingly faster response in triggering corrective measures for the likely failure of the steering control mechanism 50. Consequently, the steering position error module 122 may be configured to produce a greater steering position error when the machine 10 turns in the wrong direction than when the machine 10 turns in the commanded direction but along a different path. Where the steering control valve command signals output by the electronic control unit 32 should cause the steering piston 74 to move in one direction but the sign of the calculated steering piston velocity indicates that the actual movement of the steering piston 74 is in the opposite direction, the steering position error module 122 may be configured to produce a greater steering position error output than when the sign of the steering piston velocity indicates that the steering piston 74 is moving in the commanded direction. Examples of calculations of the steering position error are discussed further below.

The steering position error from the steering position error module 122 may be input to an integrator 124 that may accumulate the steering position errors over a series of signals from the steering piston position sensor 104 and the steering control device 102. The uncommanded motion monitoring algorithm 120 may execute at the 20 msec sampling rate of the steering piston position sensor 104 discussed above to allow for the appropriate response over the range of operating speeds of the machine 10. The steering position error is added to a cumulative integration value at the integrator 114 for subsequent comparison to an integration limit. The cumulative integration value may continue to be increased as long as the actual steering piston position differs from the commanded steering position by an amount greater than the error threshold. If the actual and commanded steering piston position are within the error threshold, uncommanded motion is no longer occurring and the cumulative integration value may be reset to zero so that the integration value can restart accumulation when uncommanded motion is again detected.

After adding the steering position error to the cumulative integration value at the integrator 124, the cumulative integration value may be compared to an integration limit at a comparator 126. The integration limit may be a constant value that, when met by the cumulative integration value, may cause a warning to be communicated to the operator. Meeting the integration limit may also cause the brakes to be applied by transmitting control signals to the brake actuators 110. Other uncommanded motion response strategies, such as shutting down the power source 14 in extreme situations, may also be initiated once the cumulative integration value exceeds the integration limit.

Additional factors may be relevant to determining the integration limit and controlling how quickly the machine 10 responds to uncommanded motion. Internal and external factors can impact the response of the machine 10 to uncommanded motion. For example, the temperature of the oil in the machine 10 may provide an indication of the viscosity of the oil and its effect on the reaction of the systems of the machine 10 and the responsiveness of the machine 10 to steering commands. The oil temperature may have an inverse relationship to the oil viscosity such that the systems are less responsive and more forgiving in the cold. Other conditions affecting the reaction of the machine 10 may be factored into the determination of the integration limit, such as the brake fluid pressure and the condition of the surface S over which the machine 10 travels. Where these and other variables affect the ability of the machine 10 to react to uncommanded motion, the uncommanded motion monitoring algorithm 120 may include integration limit lookup tables, calculation software modules, or other methods for determining the integration limit for the current operating conditions, and the electronic control unit 32 may be configured to received and evaluate information for multiple factors affecting the operation of the machine 10. Other factors affecting the operation and responsiveness of the machine 10 will be apparent to those skilled in the art, as well as their incorporation into the determination of the integration limit, and are contemplated by the inventors as having use in detecting and reacting to uncommanded motion in accordance with the present disclosure.

INDUSTRIAL APPLICABILITY

Figure 6:
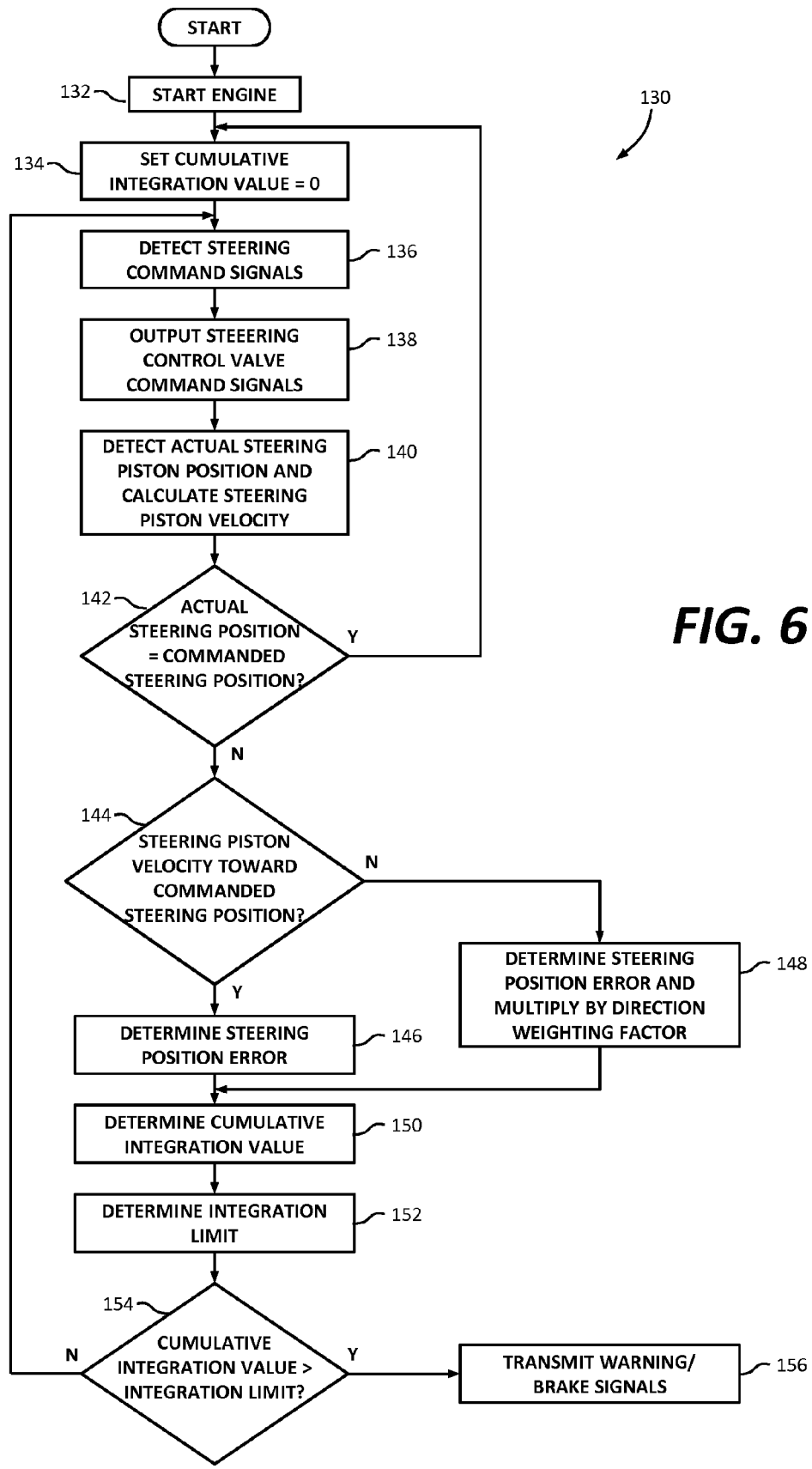
FIG. 6 is a block diagram of an electro-hydraulic steering control routine in accordance with the present disclosure implementing the uncommanded motion monitoring algorithm of FIG. 5 in the machine of FIG. 1.

The uncommanded motion monitoring algorithm 120 may be implemented at the electronic control unit 32 within a steering control routine 130 as shown in FIG. 6. The steering control routine 130 may begin at a block 132 where the power source 14 is started by the electronic control unit 32 when the operator actuates a starter of the machine 10 within the operator control station 18. After the power source 14 is started, control may pass to a block 134 where the electronic control unit 32 may initialize a cumulative integration value stored at the memory 92 by setting the value to zero to indicate that uncommanded motion of the machine 10 has not been detected. With the power source 14 running, the operator may make additional preparations for operating the machine 10, such as positioning the screed 28 with respect to the surface S, and engaging a transmission with the power source 14, and then begin to propel the machine 10 forward or backward.

With the machine 10 moving, control may pass to a block 136 where the electronic control unit 32 may detect steering command signals from the steering control device 102. Depending on the type of steering control device 102, the steering control device 102 may transmit a continuous control signal to the electronic control unit 32 having a zero or neutral value when the machine 10 should move in a straight path with the front wheels 16 oriented parallel to the rear wheels 17, or having a value indicating turns to the right or the left with the steering control mechanism 50 turning the front wheels 16 toward the commanded path. The steering control device 102 may alternatively transmit no signal when the steering control device 102 is maintained in a constant position, and transmit a signal from the steering control device 102 to communicate a change from a current position to a new position to cause a turn to the left or to the right from the current path of travel. Regardless of the type of steering control device 102, the electronic control unit 32 is configured to receive the signals from the steering control device 102 and interpret the signals to determine a direction of the path of travel for the machine 10.

With the commanded path of the machine 10 received from the steering control device 102, control may pass to a block 138 where the electronic control unit 32 may generate a steering command signal to move the steering piston in a commanded steering direction that is in one of the first piston direction (left or right) and the second piston direction, and output steering control valve command signals to the steering control valve actuators 64 to position the front wheels 16 to move the machine 10 along the commanded path. If the steering command signals indicate that the machine 10 should continue on the current path, the steering control valve command signals will cause the steering control valve actuators 64 to maintain the valve element 60 at the normally-closed position and maintain the current position of the steering piston 74. If the steering command signals indicate that the machine 10 should turn right or left from the current path, the steering control valve command signals will cause the steering control valve actuators 64 to move the valve element 60 to a position to provide steering fluid to the steering cylinder 58 to cause the steering piston 74 to turn the front wheels 16 toward the new path indicated by the steering command signals.

As the machine 10 moves under the commands from the steering control device 102, the machine 10 may move along the commanded path, or may deviate from the commanded path due to uncommanded motion. Control of the steering control routine 130 may pass to a block 140 where the electronic control unit 32 may determine the actual steering piston position of the steering piston 74 and, correspondingly, the actual path of travel of the machine 10, and calculate the steering piston velocity of the steering piston 74 as described above. The steering piston velocity may be used subsequently to determine whether an actual piston movement direction from a previous steering piston position to the actual steering piston position. In the embodiment of FIG. 4, the position of the steering piston 74 may be determined via steering piston position signals provided by the steering piston position sensor 104 wherein the position signals will be indicative of the orientation of the front wheels 16. Of course, other sensors could be used to determine the direction of the front wheels 16, such as a rotation sensor detecting the position of a front wheel 16 relative to a vertical axis, a yaw rate sensor measuring an angular velocity of the machine 10 about a vertical axis, and the like, providing output signals from which the electronic control unit 32 may determine the actual position of the steering piston 74 and the path of travel of the machine 10.

After determining the actual steering piston position and the steering piston velocity at the block 140, control may pass to a block 142 where the electronic control unit 32 may compare the actual steering piston position to the commanded steering piston position output by the electronic control unit 32. If the electronic control unit 32 determines that the actual steering piston position is equal to or within a predetermined error threshold of the commanded steering piston position, then undesirable uncommanded motion may not be occurring and control may pass back to the block 134 to reinitialize the cumulative integration value to zero so that the accumulation can begin anew when uncommanded motion is detected. An amount of difference between the actual and commanded steering piston positions may be acceptable and not be considered an indication of uncommanded motion. Small differences may be attributable to other operating conditions that may affect the ability of the machine 10 to respond to the steering command signals as anticipated by the electronic control unit 32. To reflect these realities of operation, an error threshold may be used to discriminate between normal variations in the response of the steering control mechanism 50 and potentially problematic uncommanded motion. In one embodiment, a 20% error threshold between the commanded and actual steering piston positions may be used, but the error threshold may be adjusted as necessary to achieve a desired response from the uncommanded motion monitoring algorithm 120. If the electronic control unit 32 determines that the actual steering piston position is not equal to the commanded steering piston position and is outside the error threshold, then undesirable uncommanded motion may be occurring and control may pass to a block 144 to determine the severity of the uncommanded motion and then to an appropriate one of a block 146 and a block 148 to determine the steering position error that is appropriate for the type of uncommanded motion.

As discussed above, uncommanded motion turning the machine 10 in the opposite direction from the commanded direction may be indicative of a non-electrical failure of the steering control mechanism 50 that may require a faster response from the electronic control unit 32. Consequently, at the block 144, the electronic control unit 32 may determine whether the front wheels 16 are turning in the wrong direction by determining whether the steering piston velocity is moving the steering piston 74 toward the commanded steering piston position. Using the conventions and examples set forth above, if a right turn of the front wheels 16 and corresponding movement of the steering piston 74 toward the positive direction is commanded, the steering piston velocity should have a positive value indicating movement of the steering piston 74 toward the commanded right turn position. A negative value of the steering piston velocity will indicate that the velocity of the steering piston 74 is moving toward the uncommanded left turn position. Similarly, when a left turn is commanded, a negative value of the steering piston velocity indicates that the steering piston 74 is moving in the commanded direction, and a positive value indicates that the steering piston 74 is moving toward the uncommanded right turn position.

If the electronic control unit 32 determines that the steering piston velocity and consequently the actual piston movement direction is toward the commanded steering direction at the block 144, control may pass to the block 146 where the electronic control unit 32 will determine the steering position error for the steering piston 74. In the illustrated embodiment, the steering position error may be set equal to the difference between the actual steering piston position and the commanded steering piston position. The greater the difference, the greater the steering position error, and the difference and the error have a linear relationship. In alternative embodiments, the electronic control unit 32 may be configured to determine the steering position error as a function of the difference between the actual and commanded piston positions, as well as other factors such as the steering piston velocity. Such functions may have a non-linear relationship with the difference between the piston positions.

If the electronic control unit 32 determines from the steering piston velocity that the steering piston is moving in an actual piston movement direction that is opposite the commanded steering direction at the block 144, control may pass to the block 148 where the electronic control unit 32 will determine a gross steering position error for the steering piston 74 and multiply the gross steering position error by a direction weighting factor reflective of the severity of turning in the opposite direction to arrive at the steering position error so that the steering position error is set to a greater value. The gross steering position error may be calculated in a similar manner as the steering position error as described in the preceding paragraph. The direction weighting factor may be predetermined based on a desired accelerated rate of response to turns in the uncommanded direction versus turning errors in the commanded direction. In one embodiment, the direction weighting factor may have a value of 5 to cause the electronic control unit 32 to react in one-fifth the time to uncommanded motion in the wrong steering direction. Of course, the value of the direction weighting factor may be varied depending on the requirements for a particular implementation. Moreover, in other variations, the gross steering position error may be used for the steering position error for turns in the uncommanded direction, and the gross steering position error may be divided by the direction weighting factor to yield the steering position error for turns in the commanded steering direction to achieve a similar result of the electronic control unit 32 reacting more quickly to the steering piston 74 moving in the direction opposite the uncommanded motion.

After the steering position error is determined at either the block 146 or the block 148, control may pass to a block 150 so that the steering position error may be added to the cumulative integration value. As the flow diagram for the steering control routine 130 shows, the cumulative integration value may be increased so long as the actual steering piston position is not equal to the commanded steering piston position. The steering position error may be input to the integrator 124, and the integrator 124 in turn will increase the cumulative integration value by the steering position error. The integration limit may be determined at a block 152 after the cumulative integration value is determined at the block 150, concurrently therewith, or at any other appropriate time prior to updating the cumulative integration value. As discussed above, the integration limit may be a constant value, or may be determined by the electronic control unit 32 based on the current values of one or more operating variables or parameters of the machine 10, such as the current temperature of the steering fluid in the steering control mechanism 50. After both values are determined at the blocks 150, 152, the cumulative integration value may be compared to the integration limit for uncommanded motion of the machine 10 at a block 154 by inputting the parameters to the comparator 126.

If the cumulative integration value is less than the integration limit, the uncommanded motion has not had sufficient magnitude and duration for the uncommanded motion monitoring algorithm 120 as implemented in the steering control routine 130 to trigger a response strategy by the electronic control unit 32 to warn the operator or stop the machine 10. In other words, the uncommanded motion is still within the acceptable limits for the current operating conditions of the machine 10. Because the cumulative uncommanded motion has not exceeded the acceptable limits, control may pass back to the block 136 to repeat the steps of the steering control routine 130 for detecting and responding to uncommanded motions in the machine by continuing executing the steering command signals provided by the steering control device 102, comparing the actual steering piston position to the commanded steering piston position, and increasing the value representing the cumulative uncommanded motion if the actual path of the machine 10 is different than the commanded path.

Alternatively, if the cumulative integration value is greater than or equal to the integration limit when compared at the block 154, control may pass to a block 156 where the electronic control unit 32 may initiate and execute an uncommanded motion response strategy in recognition of the magnitude and duration of the uncommanded motion exceeding the acceptable limits. In one implementation, the response strategy may include providing warnings or alarms for the operator at the output device(s) 112 at the operator control station 18 and/or remote control locations while allowing the machine 10 to continue operating with uncommanded motion. The warnings may include causing the electronic control unit 32 to illuminate a warning lamp (not shown) in the operator control station 18, to output an auditory alarm message or siren from a speaker (not shown), to output a visual alarm message at a display device (not shown) in the operator station, or otherwise notify the operator. Where operation of the machine 10 continues, control may pass back to the block 136 from the block 156 to continue monitoring the motion of the machine 10. If the uncommanded motion continues, the alarms and warnings may continue. If the uncommanded motion ceases, the electronic control unit 32 may stop the outputting of the alarm and warning messages from the output device(s) 112 when the cumulative integration value is reset to zero at the block 134. In other implementations, the response strategy may include disengaging the transmission, applying brakes (not shown) of the machine 10 by transmitting control signals to the brake actuators 110, shutting down the power source 14, or otherwise stopping the machine 10 in addition to outputting warning messages and/or alarms notifying the operator of the reason for automatically stopping the machine 10. With the machine 10 stopped, the operator, technician, maintenance worker or the like can assess the status of the machine 10 and the steering control mechanism 50, and determine the cause of the uncommanded motion.

The uncommanded motion monitoring algorithm 120 as implemented in the steering control routine 130 addresses issues existing in previous systems relating to the response of the machine 10 to types of uncommanded motion that are more problematic, such as when the steering velocity of the machine is not going in the direction of the desired steering direction. Previous steering control strategies treated uncommanded motion in a similar manner regardless of whether the machine 10 was turning in the commanded direction but at a different turn rate versus turning in the opposite direction. However, steering in the wrong direction is a more severe problem than steering too much or too little in the commanded direction as it can be indicative of non-electrical failures in the steering control mechanism 50, such as leaks in steering cylinder 58 or in the steering fluid supply lines 68, 70 that can cause the steering piston 74 to move in a manner that cannot be corrected by controlling the output of the steering control valve 56. The uncommanded motion monitoring algorithm 120 and the steering control routine 130 address the issue of wrong direction uncommanded motion by accelerating the response of the electronic control unit 32.

Use of the direction weighting factor facilitates tailoring the response to uncommanded motion to the particular machine 10 and its operating requirements. Adjusting the direction weighting factor to increase or decrease the disparity between the steering position errors for wrong direction and commanded direction steering allows for correspondence between the severity of the wrong direction steering errors and the ability of the electronic control unit 32 to detect the uncommanded motion, notify the operator and, if necessary, stop the machine 10. Additionally, other parameters of the uncommanded motion monitoring algorithm 120 and the steering control routine 130, such as the integration limit and the sampling rate for the steering piston position sensor 104, may also be adjusted as necessary to achieve an overall desired response of the machine 10 to all types of uncommanded motion.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A steering control system for a machine, the steering control system comprising:

a hydraulic steering cylinder having a steering piston that moves in a first piston direction to cause the machine to turn toward a first turn direction and moves in a second piston direction to cause the machine to turn toward a second turn direction;

a steering control mechanism operatively connected to the hydraulic steering cylinder and actuatable to cause the steering piston to move in the first piston direction and the second piston direction;

a steering control device for providing a steering command signal indicating a command to cause the machine to turn in one of the first turn direction and the second turn direction;

a steering piston position sensor operatively connected to the hydraulic steering cylinder to detect a position of the steering piston and to transmit a steering piston position signal indicating the position of the steering piston; and an electronic control unit operatively connected to the steering control mechanism, the steering control device, and the steering piston position sensor, the electronic control unit configured to:

receive the steering command signal from the steering control device and output a steering control mechanism command signal to cause the steering control mechanism to actuate to move the steering piston in the one of the first piston direction and the second piston direction corresponding to the one of the first turn direction and the second turn direction in the steering command signal, determine an actual steering piston position of the steering piston based on the steering piston position signal, compare the actual steering piston position to a commanded steering piston position, determine a steering position error in response to determining that the actual steering piston position is not equal to the commanded steering piston position, add the steering position error to a cumulative integration value, the cumulative integration value being increased so long as the actual steering piston position is not equal to the commanded steering piston position, compare the cumulative integration value to an integration limit for uncommanded motion of the machine, and execute an uncommanded motion response strategy in response to determining that the cumulative integration value is greater than the integration limit.

2. The steering control system of claim 1, wherein the electronic control unit is configured to set the steering position error equal to a difference between the actual steering piston position and the commanded steering piston position.

3. The steering control system of claim 1, wherein the electronic control unit is configured to determine a steering piston velocity from a previous steering piston position to the actual steering piston position, and the electronic control unit is configured to set the steering position error to a greater value in response to determining from the steering piston velocity that the steering piston is moving in an actual piston movement direction that is opposite the one of the first piston direction and the second piston direction corresponding to the one of the first turn direction and the second turn direction in the steering command signal.

4. The steering control system of claim 1, wherein the electronic control unit is configured to determine an actual piston movement direction from a previous steering piston position to the actual steering piston position, and the electronic control unit is configured to set the steering position error to a greater value in response to determining that the actual piston movement direction is opposite the one of the first piston direction and the second piston direction corresponding to the one of the first turn direction and the second turn direction in the steering command signal.

5. The steering control system of claim 4, wherein the electronic control unit is configured to set the steering position error equal to a difference between the actual steering piston position and the commanded steering piston position in response to determining that the actual piston movement direction is equal to the one of the first piston direction and the second piston direction corresponding to the one of the first turn direction and the second turn direction in the steering command signal, and the electronic control unit is configured to set the steering position error equal to the difference between the actual steering piston position and the commanded steering piston position multiplied by a direction weighting factor in response to determining that the actual piston movement direction is opposite the one of the first piston direction and the second piston direction corresponding to the one of the first turn direction and the second turn direction in the steering command signal.

6. The steering control system of claim 4, wherein the electronic control unit is configured to set the steering position error equal to a difference between the actual steering piston position and the commanded steering piston position in response to determining that the actual piston movement direction is opposite the one of the first piston direction and the second piston direction corresponding to the one of the first turn direction and the second turn direction in the steering command signal, and the electronic control unit is configured to set the steering position error equal to the difference between the actual steering piston position and the commanded steering piston position divided by a direction weighting factor in response to determining that the actual piston movement direction is equal to the one of the first piston direction and the second piston direction corresponding to the one of the first turn direction and the second turn direction in the steering command signal.

7. The steering control system of claim 1, wherein the electronic control unit is configured to set the cumulative integration value equal to zero in response to determining that the actual steering piston position is equal to the commanded steering piston position.

8. The steering control system of claim 1, wherein the electronic control unit is configured to repeat steps for determining whether the actual steering piston position is equal to the commanded steering piston position in response to determining that the cumulative integration value is less than the integration limit.

9. A method for detecting and responding to uncommanded motion in a machine having a hydraulic steering cylinder with a steering piston that moves in a first piston direction to cause the machine to turn in a first turn direction and moves in a second piston direction to cause the machine to turn in a second turn direction, the method for detecting and responding to uncommanded motion in the machine comprising:

generating, at an electronic control unit, a steering command signal to move the steering piston in one of the first piston direction and the second piston direction;

determining, at the electronic control unit, an actual steering piston position of the steering piston;

comparing, at the electronic control unit, the actual steering piston position to a commanded steering piston position;

determining, at the electronic control unit, a steering position error in response to determining that the actual steering piston position is not equal to the commanded steering piston position;

adding, at the electronic control unit, the steering position error to a cumulative integration value for uncommanded motion, the cumulative integration value being increased so long as the actual steering piston position is not equal to the commanded steering piston position;

comparing, at the electronic control unit, the cumulative integration value to an integration limit for uncommanded motion of the machine; and executing, at the electronic control unit, an uncommanded motion response strategy in response to determining that the cumulative integration value is greater than the integration limit.

10. The method for detecting and responding to uncommanded motion in the machine of claim 9, wherein determining, at the electronic control unit, the steering position error comprises setting the steering position error equal to a difference between the actual steering piston position and the commanded steering piston position.

11. The method for detecting and responding to uncommanded motion in the machine of claim 9, comprising:

determining, at the electronic control unit, a steering piston velocity from a previous steering piston position to the actual steering piston position; and setting, at the electronic control unit, the steering position error to a greater value in response to determining from the steering piston velocity that the steering piston is moving in an actual piston movement direction that is opposite the one of the first piston direction and the second piston direction in the steering command signal.

12. The method for detecting and responding to uncommanded motion in the machine of claim 9, comprising:
    determining, at the electronic control unit, an actual piston movement direction from a previous steering piston position to the actual steering piston position; and
    setting, at the electronic control unit, the steering position error to a greater value in response to determining that the actual piston movement direction is opposite the one of the first piston direction and the second piston direction in the steering command signal.

13. The method for detecting and responding to uncommanded motion in the machine of claim 12, comprising:
    setting, at the electronic control unit, the steering position error equal to a difference between the actual steering piston position and the commanded steering piston position in response to determining that the actual piston movement direction is equal to the one of the first piston direction and the second piston direction in the steering command signal; and
    setting, at the electronic control unit, the steering position error equal to the difference between the actual steering piston position and the commanded steering piston position multiplied by a direction weighting factor in response to determining that the actual piston movement direction is opposite the one of the first piston direction and the second piston direction in the steering command signal.

14. The method for detecting and responding to uncommanded motion in the machine of claim 12, comprising:
    setting, at the electronic control unit, the steering position error equal to a difference between the actual steering piston position and the commanded steering piston position in response to determining that the actual piston movement direction is opposite the one of the first piston direction and the second piston direction in the steering command signal; and
    setting, at the electronic control unit, the steering position error equal to the difference between the actual steering piston position and the commanded steering piston position divided by a direction weighting factor in response to determining that the actual piston movement direction is equal to the one of the first piston direction and the second piston direction in the steering command signal.

15. The method for detecting and responding to uncommanded motion in the machine of claim 9, comprising setting, at the electronic control unit, the cumulative integration value equal to zero in response to determining that the actual steering piston position is equal to the commanded steering piston position.

16. The method for detecting and responding to uncommanded motion in the machine of claim 9, comprising repeating steps of the method for detecting and responding to uncommanded motion in the machine in response to determining that the cumulative integration value is less than the integration limit.

17. A method for detecting and responding to uncommanded motion in a machine having a steering control mechanism that causes the machine to turn in a first turn direction and in a second turn direction, the method for detecting and responding to uncommanded motion in the machine comprising:
    generating, at an electronic control unit, a steering command signal to cause the steering control mechanism to turn the machine in one of the first turn direction and the second turn direction;
    determining, at the electronic control unit, an actual steering direction of the machine;
    comparing, at the electronic control unit, the actual steering direction to a commanded steering direction of the steering command signal;
    calculating, at the electronic control unit, a steering position error in response to determining that the actual steering direction is not equal to the commanded steering direction, wherein the steering position error is set to a greater value in response to determining that the actual steering direction is opposite the one of the first turn direction and the second turn direction in the steering command signal;
    adding, at the electronic control unit, the steering position error to a cumulative integration value for uncommanded motion, the cumulative integration value being increased so long as the actual steering direction is not equal to the commanded steering direction;
    comparing, at the electronic control unit, the cumulative integration value to an integration limit for uncommanded motion of the machine; and
    executing, at the electronic control unit, an uncommanded motion response strategy in response to determining that the cumulative integration value is greater than the integration limit.

18. The method for detecting and responding to uncommanded motion in the machine of claim 17, comprising:
    setting, at the electronic control unit, the steering position error equal to a difference between the actual steering direction and the commanded steering direction in response to determining that the actual steering direction is in a same direction as the one of the first turn direction and the second turn direction in the steering command signal; and
    setting, at the electronic control unit, the steering position error equal to the difference between the actual steering direction and the commanded steering direction multiplied by a direction weighting factor in response to determining that the actual steering direction is opposite the one of the first turn direction and the second turn direction in the steering command signal.

19. The method for detecting and responding to uncommanded motion in the machine of claim 17, comprising:
    setting, at the electronic control unit, the steering position error equal to a difference between the actual steering direction and the commanded steering direction in response to determining that the actual steering direction is opposite the one of the first turn direction and the second turn direction in the steering command signal; and
    setting, at the electronic control unit, the steering position error equal to the difference between the actual steering direction and the commanded steering direction divided by a direction weighting factor in response to determining that the actual steering direction is in a same direction as the one of the first turn direction and the second turn direction in the steering command signal.

20. The method for detecting and responding to uncommanded motion in the machine of claim 17, comprising:
    setting, at the electronic control unit, the cumulative integration value equal to zero in response to determining that the actual steering direction is equal to the commanded steering direction; and repeating steps of the method for detecting and responding to uncommanded motion in the machine in response to determining that the cumulative integration value is less than the integration limit.

\* \* \* \* \*